United States Patent
Ott

(10) Patent No.: US 6,654,775 B1
(45) Date of Patent: Nov. 25, 2003

(54) OPTIMIZED SYSTEM AND METHOD FOR PARALLEL LEADING ONE/ZERO ANTICIPATION

(75) Inventor: Michael L. Ott, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/511,218

(22) Filed: Feb. 23, 2000

(51) Int. Cl.[7] ................................................. G06F 7/00
(52) U.S. Cl. ...................................................... 708/211
(58) Field of Search ................................. 708/205, 211, 708/505

(56) References Cited

U.S. PATENT DOCUMENTS

| | | | | |
|---|---|---|---|---|
| 5,633,819 A | * | 5/1997 | Brashears et al. | 708/505 |
| 5,805,486 A | | 9/1998 | Sharangpani | |
| 5,844,826 A | * | 12/1998 | Nguyen | 708/211 |
| 5,974,432 A | * | 10/1999 | Orup | 708/205 |
| 6,360,238 B1 | * | 3/2002 | Dhong et al. | 708/205 |
| 6,499,044 B1 | * | 12/2002 | Brooks et al. | 708/211 |

* cited by examiner

Primary Examiner—Chuong Dinh Ngo
(74) Attorney, Agent, or Firm—Matine & Penilla, LLP

(57) ABSTRACT

An optimized system and method for a parallel leading zero anticipation which ascertains "end of run" patterns in parallel. A string representing the operands of the floating-point addition is divided into nibbles of predetermined bit length (normally 4 bits). Each nibble is analyzed for the end of run patterns and the results from this analysis determine whether a run of leading zero's or one's has ended within the nibble, and if there has been an end of run, the location (bit) of the end of run. The highest order nibble that has an end of run provides the higher order bits in the LZA (leading zero anticipator output) value, while the lower two bits of the LZA value are correlated from the location end of run within the nibble, as previously determined.

9 Claims, 4 Drawing Sheets

OPTIMIZED SYSTEM AND METHOD FOR PARALLEL LEADING ONE/ZERO ANTICIPATION

BACKGROUND OF THE INVENTION

1. Field of the Invention

This invention pertains generally to parallel leading one/zero anticipation algorithms. More particularly, the invention is an optimized system and method for a parallel leading one/zero anticipation in floating-point addition which ascertains "end of run" patterns in parallel, rather than using carry-lookahead scheme.

2. The Prior Art

In floating-point addition, the result of an operation may require a left shift during normalization, as is known in the art. Normalization is normally carried out using leading one/zero detection (LOZD) or leading one/zero anticipation (LOZA). LOZD and LOZA are described in further detail in the technical paper entitled "LEADING ONE PREDICTION—IMPLEMENTATION, GENERALIZATION, AND APPLICATION" by Nhon Quach and Michael J. Flynn, published by Stanford University, March 1991, which is incorporated herein by reference.

FIG. 1 depicts the normalization process using an LOZD algorithm. In FIG. 1, the LOZD unit 1 receives the result of the addition from ADDER unit 2, and then performs a leading one/zero detection by counting the number of preceding zero's or one's in the result. This number is then used to drive a SHIFTER unit 3 to produce the final normalized result. Because the detection of the leading one or zero is not carried out until the result is calculated by the ADDER 2, the normalization with LOZD is a slow process.

FIG. 2 depicts the normalization process using an LOZA algorithm. In FIG. 2, the LOZA unit 4 calculates the number of preceding zero's or one's directly from input operands, rather than from the calculated result from ADDER unit 2. Thus the LOZA unit 4 carries out the prediction operation in parallel with the addition operation by ADDER 2, yielding a faster overall process than the LOZD process described in FIG. 1.

LOZA algorithms are generally based on a bit pattern detection framework. More particularly, LOZA algorithms detect bit patterns in a string generated from the operands for the floating-point addition. Where $a_i$ and $b_i$ are the $i^{th}$ bit of the input operands A and B, respectively, the LOZA algorithm generates the string according to the following formulas:

$T_i = a_i \oplus b_i$ (exclusive or), $Z_i = \overline{a_i \vee b_i}$ (NOR), $G_i = a_i b_i$ (AND).

Thus for operands A=11110001 and B=00010000, the generated string is TTTGZZZT or $T^3GZ^3T$, where $T^i$ denotes a string of T's of length i. According to LOZA algorithms, only the following bit pattern will produce a string of preceding zero's:

$T^*GZ^*$ (STRING 1), where T* denotes a string of any number of T's (including the empty string).

Likewise, only the following bit pattern will produce a string of preceding one's:

$T^*ZG^*$ (STRING 2).

Thus, LOZA algorithms are configured to detect the above described string patterns (STRING 1 and STRING 2) for producing leading zero's and one's, and to ascertain a "left shift signal" if any of the patterns are found. The left shift signal indicates the number of factors to left shift the resulting value.

It is preferred that the time for the LOZA 4 process is equal to or less than the time for the ADDER 2 process to thereby enable the LEFT SHIFTER UNIT 3 to carry out its operation as soon as ADDER 2 completes. As such prior act implementations of LOZA 4 units have commonly employed a scheme similar to the ADDER 2, namely a parallel carry lookahead (CLA) scheme. An illustrative LOZA scheme is provided in the Nhon Quach paper noted above, entitled "LEADING ONE PREDICTION—IMPLEMENTATION, GENERALIZATION, AND APPLICATION" published by Stanford University, March 1991. Under this CLA scheme, the LOZA algorithm is carried out in log n steps.

Accordingly, there is a need for an optimized system and method for detecting leading zero's and one's which does not require carry lookahead implementation and improves the speed of the detection process. The present invention satisfies these needs, as well as others, and generally overcomes the deficiencies found in the background art.

BRIEF DESCRIPTION OF THE INVENTION

The present invention is an optimized system and method for anticipating leading zero's and one's in a floating point-addition of two operands. In general, the operands of the floating-point addition are represented by a "TGZ" string according to conventional LOZA analysis, as described above, wherein:

$T_i = a_i \oplus b_i$ (exclusive or), $Z_i = \overline{a_i \vee b_i}$ (NOR), $G_i = a_i b_i$ (AND).

Thus for operands A=11110001 and B=00010000, the string representing the operands (A and B) is TTTGZZZT or $T^3GZ^3T$, where $T^i$ denotes a string of T's of length i. The present invention operates on this string to anticipate a count of leading one's and zero's (LOZA) as described herein.

According to a first embodiment of the invention, the method for generating a count of leading zero's and one's in a floating-point addition of two operands, the two operands represented by a "TGZ" string, the method comprising separating the TGZ string into a plurality of nibbles, each having at least bits identified as bit 0 and bit 1; inspecting nibble data corresponding to each nibble for an end-of-run pattern to determine if the nibble has an end of run; identifying bit position of the end of run within each nibble having an end-of-run; identifying the most significant nibble having an end-of-run from the plurality of nibbles; and correlating position of the most significant nibble having an end-of-run with the corresponding bit position of the end-of-run for the most significant nibble to generate a count of leading one's and zero's.

According to another embodiment of the invention, the system comprises a plurality of nibble logic units, each configured to inspect nibble data corresponding to each nibble for an end-of-run pattern to determine if the nibble has an end of run, each nibble logic unit further configured to identify the bit position of the end of run for each nibble having an end-of-run; a priority encoding unit operatively coupled to each nibble logic unit, the priority encoding unit configured to identify a most significant nibble having an end-of-run from the plurality of nibbles; and a multiplexer unit operativley coupled to each nibble logic unit and to the prioirty encoding unit, the multiplexer unit configured to correlate the most significant nibble having an end-of-run with corresponding bit position of the end of run for the most significant nibble.

The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 3:
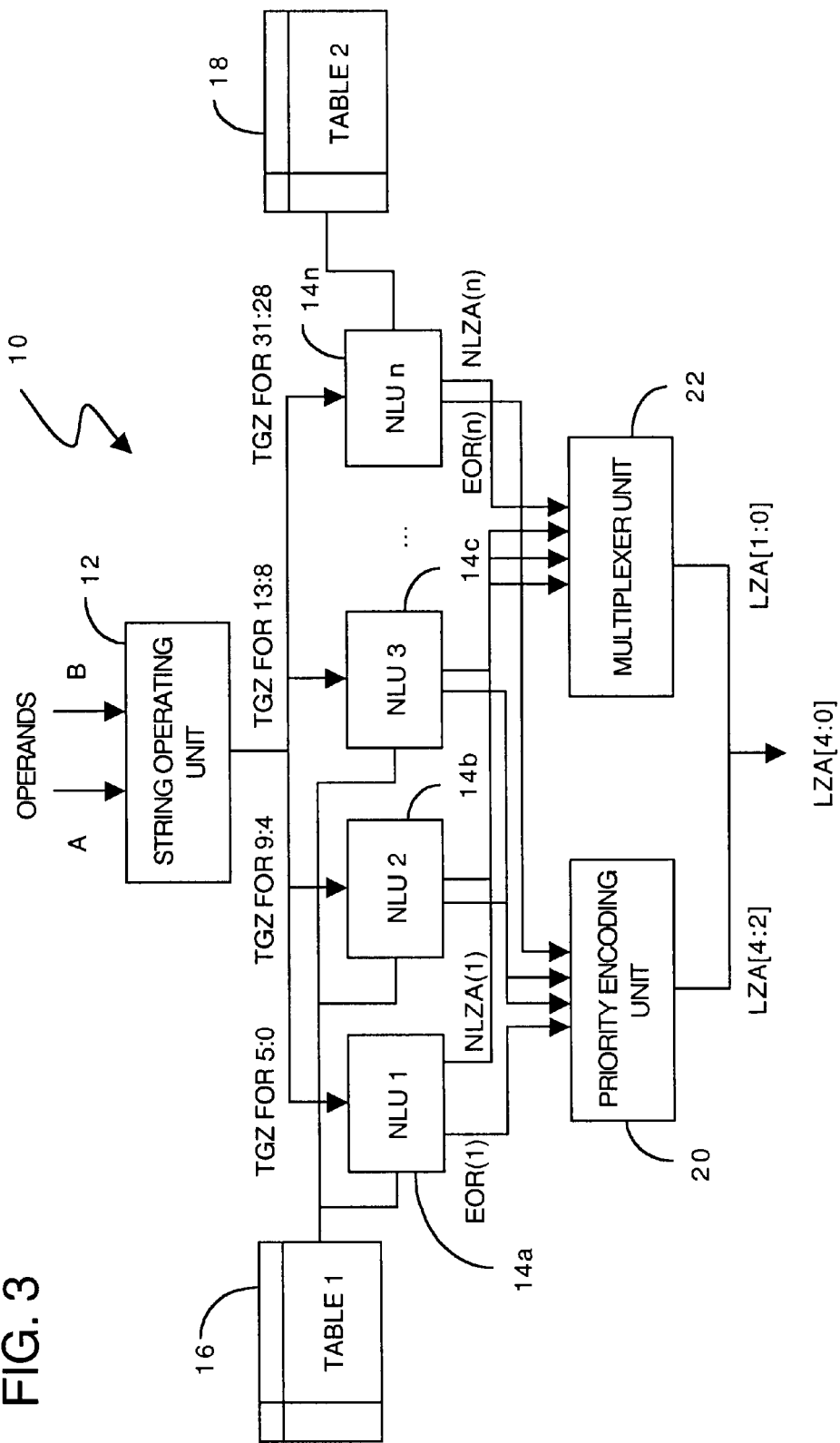
FIG. 3 is a functional block diagram depicting an LOZA system implementation according to the present invention.
Figure 4:
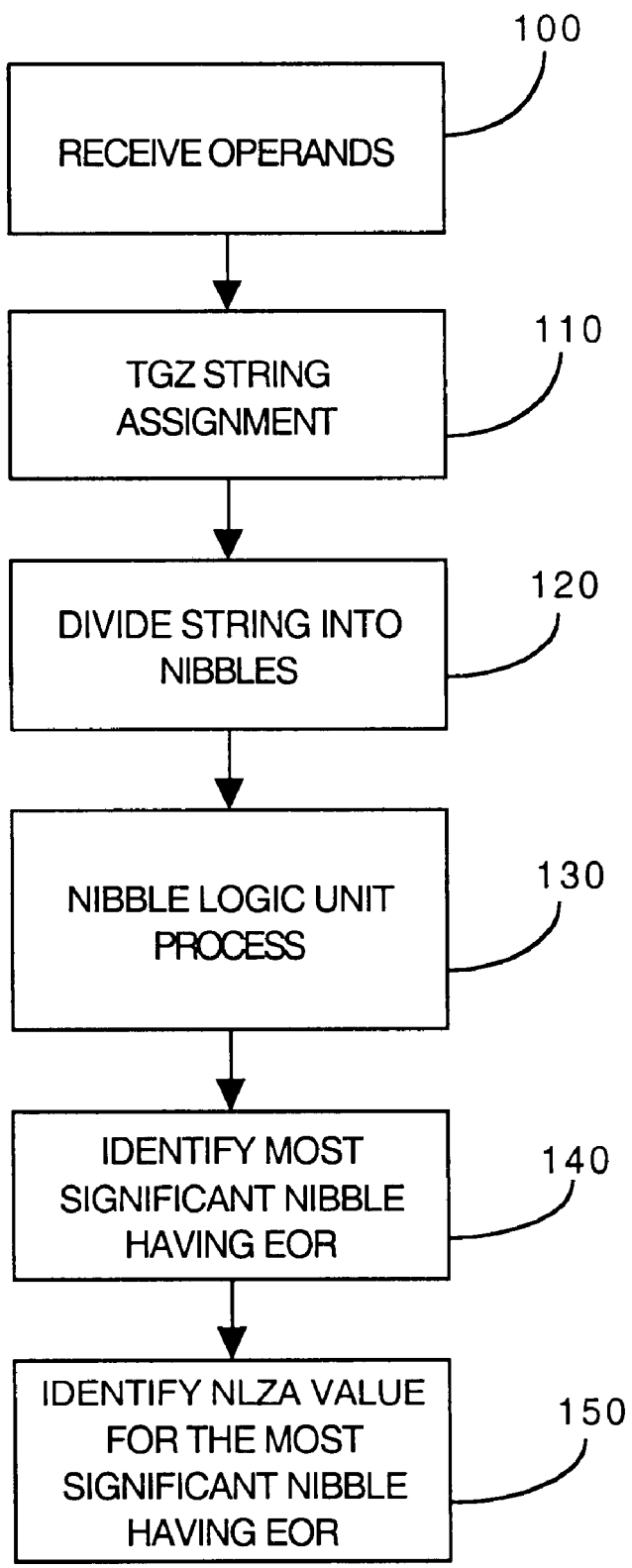
FIG. 4 is a flow chart showing generally the acts associated with carrying out the LOZA implementation in accordance with the present invention.
Figure 5:
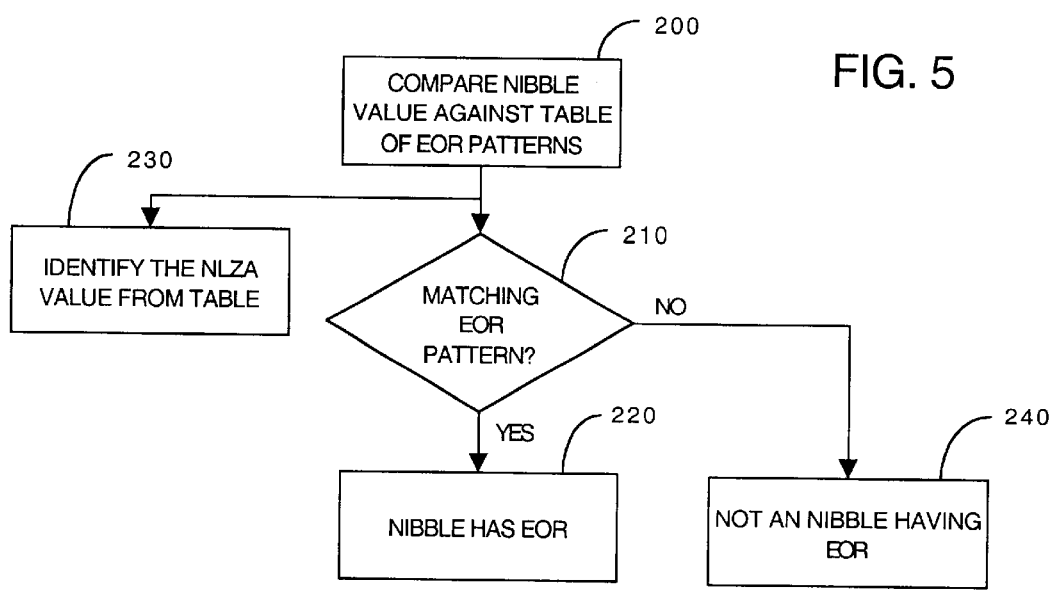
FIG. 5 is a flow chart showing generally the acts associated with carrying out the nibble logic unit in accordance with the present invention.

Referring more specifically to the drawings, for illustrative purposes the present invention is embodied in the apparatus shown FIG. 3 and the method outlined in FIG. 4 and FIG. 5. It will be appreciated that the apparatus may vary as to configuration and as to details of the parts, and that the method may vary as to details and the order of the acts, without departing from the basic concepts as disclosed herein. The invention is disclosed generally in terms of a system and method for anticipating zero's and one's in a floating-point addition, although numerous other uses for the invention will suggest themselves to persons of ordinary skill in the art.

Figure 1:
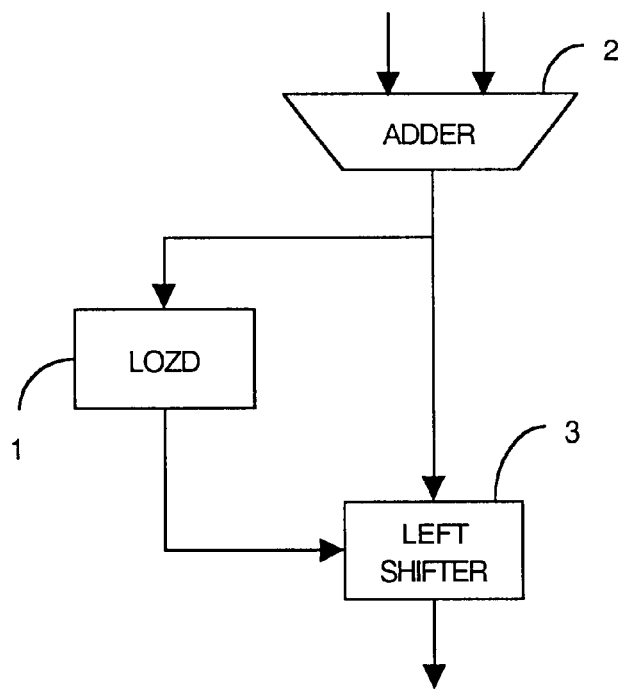
FIG. 1 depicts the normalization process of a floating point addition using an LOZD algorithm.
Figure 2:
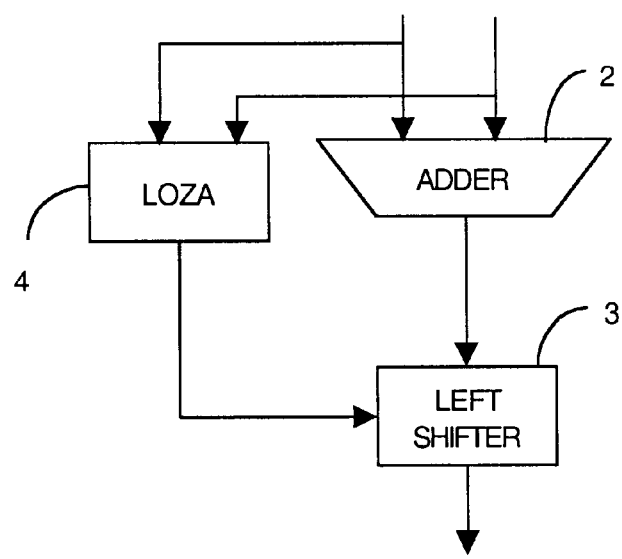
FIG. 2 depicts the normalization process of a floating point addition using an LOZA algorithm.

Referring first to FIG. 3, as well as FIG. 2, there is generally shown a functional block diagram of an LOZA system implementation 10 in accordance with the present invention. It is noted that the processes of system 10 are carried out in parallel with the processes of ADDER unit 2 (FIG. 2).

System 10 comprises a string operating unit 12 operatively coupled to a plurality of Nibble Logic Units (NLU) 14a through 14n. The string operating unit 12 carries out the operation of receiving operands (generally shown as A and B) which are also operated on by the ADDER unit 2. The operands may comprise any bit-length value. For purposes of illustration only, the example operands depicted in system 10 comprise 32-bit numbers.

The string operating unit 12 further carries out the operation of converting the operands into a string representation ("TGZ string"), as is conventionally carried out in LOZA implementations. Namely, the operands of the floating-point addition are represented by a TGZ string wherein:

$T_i = a_i \oplus b_i$ (exclusive or), $Z_i = \overline{a_i \vee b_i}$ (NOR), $G_i = a_i b_i$ (AND).

Thus for operands A=11110001 and B=00010000, the TGZ string representing the operands (A and B) is TTTG-ZZZT or $T^3GZ^3T$, where $T^i$ denotes a string of T's of length i. By way of naming convention, TGZ string comprises TGZ bit 0 through TGZ bit (n−1) which is represented by TGZ [n−1:0], where n is the number of bits each of the operands. Thus for a 32-bit operand example, TGZ string comprises TGZ [31:0].

The string operating unit 12 also carries out the operation of dividing the TGZ string into a plurality of nibbles (or segments) of predetermined bit size. Preferably, the nibbles comprise 4-bit length segments, although the invention may be used with other bit length nibbles. In the present example, where the operand bit length is 32 bits (bit 0 through bit 31, or 31:0), the string operating unit 12 would divide the TGZ string (TGZ[31,0]) into 8 nibbles of 4 bits each. Nibble 1 comprises bit 0 through bit 3 (TGZ[3:0]), Nibble 2 comprises TGZ[7:4], Nibble 3 comprises TGZ[11:8], Nibble 4 comprises TGZ[15:12], Nibble 5 comprises TGZ[19:16], Nibble 6 comprises TGZ[23:20], Nibble 7 comprises TGZ [27;24], and Nibble 8 comprises TGZ[31:28].

The string operating unit 12 then passes each to each of the NLU's 14a through 14n corresponding nibble data (4 bits) and additional bit values (the two lowest bits from the next higher nibble). However, the string operating unit 12 only passes corresponding nibble data (4 bits) to the most significant nibble (Nibble 8, in the above example) since it is the highest nibble. For example, string operating unit 12 passes NLU 1 (14a) TGZ[5:0] (i.e., bits 0 through bit 5). TGZ[5:0] comprises Nibble 1 data (bit 0 through bit 3) and the two lowest bits from Nibble 2 (bit 4 and bit 5). Likewise, string operating unit 12 passes NLU 2 (14b) TGZ [9:4] and NLU 3 (14c) TGZ [13:8], correspondingly. However, string operating unit 12 only passes NLU n TGZ [31:28] (4 bits).

NLU 14a through 14(n−1) (all NLU's except the most significant NLU) are operatively coupled to a first "Table of end of run patterns", generally designated as Table 1 (16). The most significant NLU (14n) is operatively coupled to a second "Table of end of run patterns", generally designated as Table 2 (18). The structure and contents of Table 1 (16) are depicted below.

TABLE 1

| Zero Pattern | One Pattern | NLZA [1:0] |
|---|---|---|
| T TTG~Z | T TTZ~G | 11 |
| T TGZ~Z | T TZG~G | 11 |
| T TG~Z | T TZ~G | 10 |
| T GZZ~Z | T ZGG~G | 11 |
| T GZ~Z | T ZG~G | 10 |
| T G~Z | T Z~G | 01 |

TABLE 1-continued

| Zero Pattern | One Pattern | NLZA [1:0] |
|---|---|---|
| TG ZZZ~Z | TZ GGG~G | 11 |
| TG ZZ~Z | TZ GG~G | 10 |
| TG Z~Z | TZ G~G | 01 |
| ~TZ ZZZ~Z | ~TG GGG~G | 11 |
| ~TZ ZZ~Z | ~TG GG~G | 10 |
| ~TZ Z~Z | ~TG G~G | 01 |
| TG ~Z | TZ ~G | 00 |
| ~TZ ~Z | ~TG ~G | 00 |

Table 1 includes three columns, the first column identifying a "Zero Pattern" for an "end of run" (EOR), the second column identifying a "One Pattern" for an EOR, and an a third column indicating the bit within the corresponding nibble where the EOR occurs (NLZA [1:0]).

The NLU's 14a through 14(n-1) carry out the operation of matching nibble data (TGZ[5:0] for NLU 1, for example) passed from string operating unit 12 against the EOR patterns in Table 1. Where a match is established between nibble data and one of the patterns in the table, an EOR is established for the nibble. The EOR indicates that within the nibble, the run of leading zero's (matching the Zero Pattern column) or run of leading one's (matching the One Pattern column) has been identified or otherwise ascertained. The notation of a tilde ("i") before a symbol, such as ~Z, indicates "not" as is known in the art.

As shown in Table 1, the EOR patterns may include one or more bits beyond the four-bit nibble. The EOR patterns are analyzed by the NLU's 14a through 14(n-1). A "space" marker is used in the EOR patterns to more fully describe the matching process. Bit value(s) to the left of the space are compared to corresponding bits of the next higher nibble, while bit value(s) to the right of the space are compared to corresponding bits in the current nibble. For example, for EOR pattern "T G~Z" and NLU 1 having TGZ[5:0] (bits 5 and 4 from next higher nibble, and bits 3 through 0 for the current nibble), bit 4 is compared with "T" since T is left of the "space", bit 3 is compared with "G", and bit 2 is compared with "~Z", which are the two bits to the right of the "space". The values of bit 5, bit 1, and bit 0 are irrelevant because the pattern does not have corresponding bit values.

As described above, the most significant nibble (NLU 14, in the above example) is operatively coupled to Table 2 (18). The structure and contents of Table 2 (18) are depicted below.

TABLE 2

| Zero Pattern | One Pattern | NLZA [1:0] |
|---|---|---|
| TTG~Z | TTZ~G | 11 |
| TGZ~Z | TZG~G | 11 |
| TG~Z | TZ~G | 10 |
| GZZ~Z | ZGG~G | 11 |
| GZ~Z | ZG~G | 10 |
| ZZZ~Z | GGG~G | 11 |
| ZZ~Z | GG~G | 10 |
| ZT | GT | 01 |

Table 2 (18), like Table 1, includes three columns, the first column identifying a "Zero Pattern" for an "end of run" (EOR), the second column identifying a "One Pattern" for an EOR, and an a third column indicating the bit within the corresponding nibble where the EOR occurs (NLZA [1:0]). It is noted that the EOR patterns of Table 2 (18) do not include corresponding bit values for then next higher nibble.

NLU 14n carries out the operation of matching nibble data (TGZ[31:28] for NLU n, for example) passed from string operating unit 12 against the EOR patterns in Table 1. Where a match is established between the nibble data and one of the patterns in the table, an EOR is established for the nibble. As described above, an EOR indicates that within the nibble, the run of leading zero's (matching the Zero Pattern column) or run of leading one's (matching the One Pattern column) has been identified or otherwise ascertained.

When a NLU 14a through 14n establishes an EOR within a corresponding nibble, as described above, the NLU also identifies the associated NLZA[1:0] value for the nibble. As noted above, the NLZA value identifies the bit value within the nibble where the end of leading zero's or one's occurs. The NLU identifies the associated NLZA[1:0] value by ascertaining the corresponding NLZA to the matching EOR pattern used from determining the EOR. For example, if NLU 3 establishes a match between TGZ[13:8] and Zero Pattern "TG ZZ", the corresponding NLZA[1:0] value for NLU 3 is 01. Likewise, if NLU n establishes a match between TGZ[31:28] and One Pattern "GT", the corresponding NLZA[1:0] value for NLU n is 01.

Each of the NLU 14a through 14n is operatively coupled to a Priority Encoding unit 20 and a multiplexer unit 22. As shown in FIG. 3, the NLU's 14a through 14n provide EOR (End-of-Run) data (EOR (1) through EOR(n), correspondingly) to the Priority Encoding unit 20. The NLU's 14a through 14n further provide NLZA[1:0] data to the Multiplexer unit 22.

The EOR data (designated EOR (1) through EOR (n)) passed from the NLU's 14a through 14n to the Priority Encoding unit 20 indicate whether an EOR was determined for the corresponding nibble, as described above (NLU 1 (14a) for Nibble 1 (TGZ[3:0]), NLU n (14n) for Nibble n (TGZ[31:28]), for example).

Since each nibble may potentially have an EOR established, only the most significant (or highest order) nibble is relevant. For example, if both NLU 3 and NLU 1 have determined an EOR for corresponding nibble 3 and nibble 1, respectively, nibble 3 is of higher significance than nibble 1 with respect to leading zero's or ones.

The priority encoding unit 20 carries out the operation of determining which the most significant NLU has identified an EOR. As noted above, NLU n is of more significance than NLU (n–1). Conventional priority encoding schemes may thus be used with the present invention to determine the most significant NLU. The output of priority encoding unit 20 identifies which nibble within string TGZ [31:0] establishes the EOR, thereby establishing the LZA value within 4-bits (LZA[4:2], for the 32-bit operand example above). The output of the priority encoding unit 20 drives the multiplexer unit 22 and provides the LZA[4:2] component.

The multiplexer unit 22 receives as its input the NLZA values from NLU's 14a through 14n and the LZA[4:2] value from the priority encoding unit 20. The muliplexer unit 22 is a conventional multiplexer and carries out the operation of associating the LZA[4:2] value with its corresponding NLZA[1:0] value and outputing this corresponding NLZA [1:0] value as LZA[1:0].

The LZA[4:2] value from priority encoding unit 20 and LZA[1:0] value from the mulitplexer unit 22 provide the complete LZA[4:0] value, which identifies within one bit the number or count of leading zero's or one's in the floating-point addition.

The method and operation of the invention will be more fully understood by reference to the flow charts of FIG. 4 and FIG. 5. The order of acts as shown in FIG. 4 and FIG. 5 and described below are only exemplary, and should not be considered limiting. Referring now to FIG. 4, as well as FIG. 2 and FIG. 3, there is generally shown the acts associated with carrying out the LOZA implementation in accordance with the present invention.

At box 100, the string operating unit 12 receives the operands used in the floating-point addition. As noted above, the LOZA process describes herein is carried out in parallel with the floating-point addition of ADDER 2. Box 110 is then carried out.

At box 110, the string operating unit 12 converts the operands (A and B) into a string representation (TGZ string) as described above. For each corresponding bits ($a_i$ and $b_i$) in the each of the operands, a corresponding T,Z, or G value (TGZ[i]) is defined in the TGZ string, according to conventional LOZA implementations. Box 120 is then carried out.

At box 120, the TGZ string is dividing into a plurality of nibbles, preferably 4-bits each. For example, where the TGZ string is 32 bits long, TGZ string is divided into 8 nibbles of 4 bits each. Nibble 1 comprises bit 0 through bit 3 (TGZ [3:0]), Nibble 2 comprises TGZ[7:4], Nibble 3 comprises TGZ[L 1:8], Nibble 4 comprises TGZ[15:12], Nibble 5 comprises TGZ[19:16], Nibble 6 comprises TGZ[23:20], Nibble 7 comprises TGZ[27;24], and Nibble 8 comprises TGZ[31:28]. The string operating unit 12 then passes nibble data to the NLU's 14a through 14n. As described above, the nibble data passed to NLU's 14a through 14(n−1) further includes the lowest two bits of the next higher nibble, while the nibble data passed to NLU 14n includes only the associated nibble data for that NLU. Box 130 is then carried out.

At box 130, the NLU's 14a through 14n carry out its processes which are described more fully below in conjunction with FIG. 5. In general, the NLU's 14a through 14n compare the nibble data received from the string operating unit 12 against a plurality of EOR patterns to ascertain if an EOR has occurred in that nibble. If an EOR is found, the NLU's 14a through 14n also identify where the EOR takes places within the nibble. Box 140 is then carried out.

At box 140, the priority encoding unit 20 identifies the most significant (or highest order) NLU 14a through 14n that has found an EOR. As noted above, the most significant NLU establishes the relevant nibble (LZA[4:2]) (from the plurality of nibbles) where the EOR takes place. The output of the priority encoding unit 20 drives the multiplexer unit 22 and provides the LZA[4:2] component of LZA[4:0]. Box 150 is then carried out.

At box 150, the multiplexer unit 22 identifies the NLZA (LZA[1:0]) value for the most significant nibble LZA[4:2] provided from the priority encoding unit. The multiplexer unit 22 correlates the LZA[4:2] with its corresponding NLZA value to ascertain and output the LZA[1:0] component value of LZA[4:0]. Box 160 is then carried out.

The LZA[4:2] data from the priority encoding unit 20 and the LZA[1:0] value from the multiplexer unit 22 provide the complete LZA[4:0] value. This LZA[4:0] value provides the count of leading zero's or one's (within one bit) in the floating-point addition.

Referring now to FIG. 5, there is generally shown the acts associated with carrying out the nibble logic unit in accordance with the present invention.

At box 200, the NLU compares the nibble data provided by the string operating unit 12 with the EOR patterns. As described above, NLU 14a through 14(n-1) use the EOR patterns in Table 1, while NLU 14n uses the EOR pattern in Table 2 to carry out the above comparison. Diamond 210 is then carried out and box 230 is carried out. It is noted that the processes associated with diamond 210 and box 230 are carried out in parallel or at the same time.

At diamond 210, the NLU determines whether the nibble data inspected by the NLU matches an EOR pattern. If a match is determined box 220 is then carried out. Otherwise box 240 is carried out.

At box 220, the nibble data inspected by the NLU matches an EOR pattern. A match indicates that a run of leading zero's or one's has ended within the nibble associated with the NLU.

At box 230, the NLU identifies the corresponding NLZA [1:0] value for the nibble data according the associated NLZA value for the EOR pattern that is matched. For example, the "ZT" EOR pattern in Table 2 has a corresponding NLZA value of "01" which indicates that the run has ended in bit one of the current nibble. As described above, the NLU passes EOR data (EOR found, for example) to the priority encoding unit 20 and NLZA data to the multiplexer unit 22 for further processing.

At box 240, the nibble data provided from the string operating unit does not match a corresponding EOR pattern, and thus an EOR is not established in the current nibble.

Accordingly, it will be seen that this invention provides an optimized system and method for anticipating leading zero's and one's. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method for generating a count of one of leading zero's and leading one's in a floating-point addition of two operands, the two operands represented by a TGZ string, said method comprising:

a) separating said TGZ string into a plurality of nibbles, each having at least two bits identified as bit 0 and bit 1, respectively;

b) inspecting nibble data corresponding to each said nibble for an end-of-run pattern to determine if said nibble has an end of run, said inspecting being performed by comparing said nibble data against a table of end-of-run patterns;

c) identifying bit position for said end of run within each said nibble having an end-of-run;

d) identifying a most significant nibble having an end-of-run pattern from said plurality of nibbles; and e) correlating position of said most significant nibble having an end-of-run with corresponding bit position of said end of run within said most significant nibble to generate a count of one of leading zero's and leading one's.

2. The method of claim 1 wherein each said nibble comprises four bits.

3. The method of claim 1 wherein said nibble data comprises:

a) bit values within said nibble; and b) if available, bit 0 and bit 1 of the next higher order nibble.

4. A leading zero anticipator system for a floating-point addition of two operands, said operands represented by a "TGZ" string divided into a plurality of nibbles, each nibble having at least two bits identified as bit 0 and bit 1, said system comprising:

a) a plurality of nibble logic units, each configured to inspect nibble data corresponding to each said nibble for an end-of-run pattern to determine if said nibble has an end of run, said inspection to be performed by comparing said nibble data against a table of end-of-run patterns, each nibble logic unit further configured to identify bit position of said end of run within each said nibble having an end-of-run;

b) a priority encoding unit operatively coupled to each said nibble logic unit, said priority encoding unit configured to identify a most significant nibble having an end-of-run from said plurality of nibbles; and c) a multiplexer unit operatively coupled to each said nibble logic unit and to said priority encoding unit, said multiplexer unit configured to correlate said most significant nibble having an end of run with corresponding bit position of said end of run for said most significant nibble.

5. The system of claim 4 wherein each said nibble comprises four bits.

6. The method of claim 4 wherein said nibble data comprises:

a) bit values within said nibble; and b) if available, bit 0 and bit 1 of the next higher order nibble.

7. A program storage device readable by a machine, tangibly embodying a program of instructions executable by the machine to perform a method for generating a count of one of leading zero's and leading one's in a floating-point addition of two operands, the two operands represented by a TGZ string, said method comprising:

a) separating said TGZ string into a plurality of nibbles, each having at least two bits identified as bit 0 and bit 1;

b) inspecting nibble data corresponding to each said nibble for an end-of-run pattern to determine if said nibble has an end of run, said inspecting being performed by comparing said nibble data against a table of end-of-run patterns;

c) identifying bit position for said end of run within each said nibble having an end-of-run;

d) identifying a most significant nibble having an end-of-run from said plurality of nibbles; and e) correlating position of said most significant nibble having an end-of-run with corresponding bit position of said end of run within said most significant nibble to generate a count of one of leading zero's and leading one's.

8. The program storage device of claim 7 wherein each said nibble comprises four bits.

9. The program storage device of claim 7 wherein said nibble data comprises:

a) bit values within said nibble; and b) if available, bit 0 and bit 1 of the next higher order nibble.

* * * * *